US012719199B2

(12) United States Patent
Nozaki et al.

(10) Patent No.: US 12,719,199 B2
(45) Date of Patent: Aug. 25, 2026

(54) CONNECTOR WITH TERMINAL RETAINER DISPLACED BETWEEN TEMPORARY AND COMPLETE LOCKING POSITION

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Nozaki, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 320 days.

(21) Appl. No.: 18/574,416

(22) PCT Filed: Jun. 16, 2022

(86) PCT No.: PCT/JP2022/024066

§ 371 (c)(1),
(2) Date: Dec. 27, 2023

(87) PCT Pub. No.: WO2023/276685

PCT Pub. Date: Jan. 5, 2023

(65) Prior Publication Data

US 2024/0322479 A1 Sep. 26, 2024

(30) Foreign Application Priority Data

Jun. 29, 2021 (JP) ................................ 2021-107480

(51) Int. Cl.
*H01R 13/436* (2006.01)

(52) U.S. Cl.
CPC ................................ *H01R 13/4368* (2013.01)

(58) Field of Classification Search
CPC ............ H01R 13/4368; H01R 13/4223; H01R 13/4362; H01R 13/42
See application file for complete search history.

(56) References Cited

U.S. PATENT DOCUMENTS 8,052,489 B2 * 11/2011 Mase .................. H01R 13/743 439/752
2003/0073353 A1 * 4/2003 Endo ................. H01R 13/4362 439/752

(Continued)

FOREIGN PATENT DOCUMENTS

JP H05-258795 A 10/1993
JP 2009-117269 A 5/2009

(Continued)

OTHER PUBLICATIONS

International Search Report issued on Jul. 12, 2022 for WO 2023/276685 A1 (4 pages).

*Primary Examiner* — Travis S Chambers
(74) *Attorney, Agent, or Firm* — Venjuris, P.C.

(57) ABSTRACT

A connector includes a terminal fitting to be inserted into a terminal accommodation chamber of a housing and a retainer attached to the housing and displaceable between a temporary locking position and a complete locking position. The retainer is formed with a resiliently deformable locking lance arranged to face the terminal accommodation chambers at the temporary locking position and a complete locking portion arranged to face the terminal accommodation chamber at the complete locking position and having a higher stiffness than the locking lance. The locking lance allows insertion of the terminal fitting into the terminal accommodation chamber by being resiliently deformed and temporarily holds the terminal fitting in a retained state by (Continued)

locking the terminal fitting in the terminal accommodation chamber. The complete locking portion holds the terminal fitting in a retained state by locking the terminal fitting inserted into the terminal accommodation chamber.

11 Claims, 15 Drawing Sheets

(56) References Cited

U.S. PATENT DOCUMENTS

2019/0044269 A1 2/2019 Shimizu
2024/0291190 A1* 8/2024 Nozaki .................. H01R 13/42

FOREIGN PATENT DOCUMENTS

JP 2012-064462 A 3/2012
WO WO-2023021858 A1 * 2/2023 ........... H01R 13/424

* cited by examiner

CONNECTOR WITH TERMINAL RETAINER DISPLACED BETWEEN TEMPORARY AND COMPLETE LOCKING POSITION

CROSS REFERENCE TO RELATED APPLICATIONS

This application is a national phase of PCT application No. PCT/JP2022/024066, filed on 16 Jun. 2022, which claims priority from Japanese patent application No. 2021-107480, filed on 29 Jun. 2021, all of which are incorporated herein by reference.

TECHNICAL FIELD

The present disclosure relates to a connector.

BACKGROUND

Patent Document 1 discloses a connector in which a terminal fitting is inserted into a cavity in a housing, primarily locked by a locking lance formed in the cavity, and secondarily locked by a retainer mounted into the housing.

PRIOR ART DOCUMENT

Patent Document

Patent Document 1: JP 2009-117269 A

SUMMARY OF THE INVENTION

Problems to be Solved

The locking lance has a cantilever shape. In the process of inserting the terminal fitting into the cavity, the locking lance interferes with the terminal fitting and is temporarily resiliently deformed. If the terminal fitting is inserted to a proper position, the locking lance resiliently returns and locks the terminal fitting. Since the housing is also formed with a mold removal space formed in molding the locking lance and a deflection allowance space for the locking lance as the locking lance is formed, the shape of the housing including the locking lance is complicated. If an attempt is made to reduce the size of the housing having a complicated shape, it becomes difficult to ensure the strength of a mold. Thus, there is a limit to the size reduction of the housing.

A connector of the present disclosure was completed on the basis of the above situation and aims to realize the size reduction of a housing.

Means to Solve the Problem

The present disclosure is directed to a connector with a housing including a terminal accommodation chamber, a terminal fitting to be inserted into the terminal accommodation chamber, and a retainer attached to the housing, the retainer being displaceable between a temporary locking position and a complete locking position, the retainer being formed with a resiliently deformable temporary locking portion arranged to face the terminal accommodation chamber at the temporary locking position and a complete locking portion arranged to face the terminal accommodation chamber at the complete locking position, the complete locking portion having a higher stiffness than the temporary locking portion, the temporary locking portion allowing insertion of the terminal fitting into the terminal accommodation chamber by being resiliently deformed and temporarily holding the terminal fitting in a retained state by locking the terminal fitting in the terminal accommodation chamber, and the complete locking portion holding the terminal fitting in a retained state by locking the terminal fitting inserted into the terminal accommodation chamber.

Effect of the Invention

According to the present disclosure, the size reduction of a housing can be realized.

DETAILED DESCRIPTION TO EXECUTE THE INVENTION

Description of Embodiments of Present Disclosure

Figure 1:
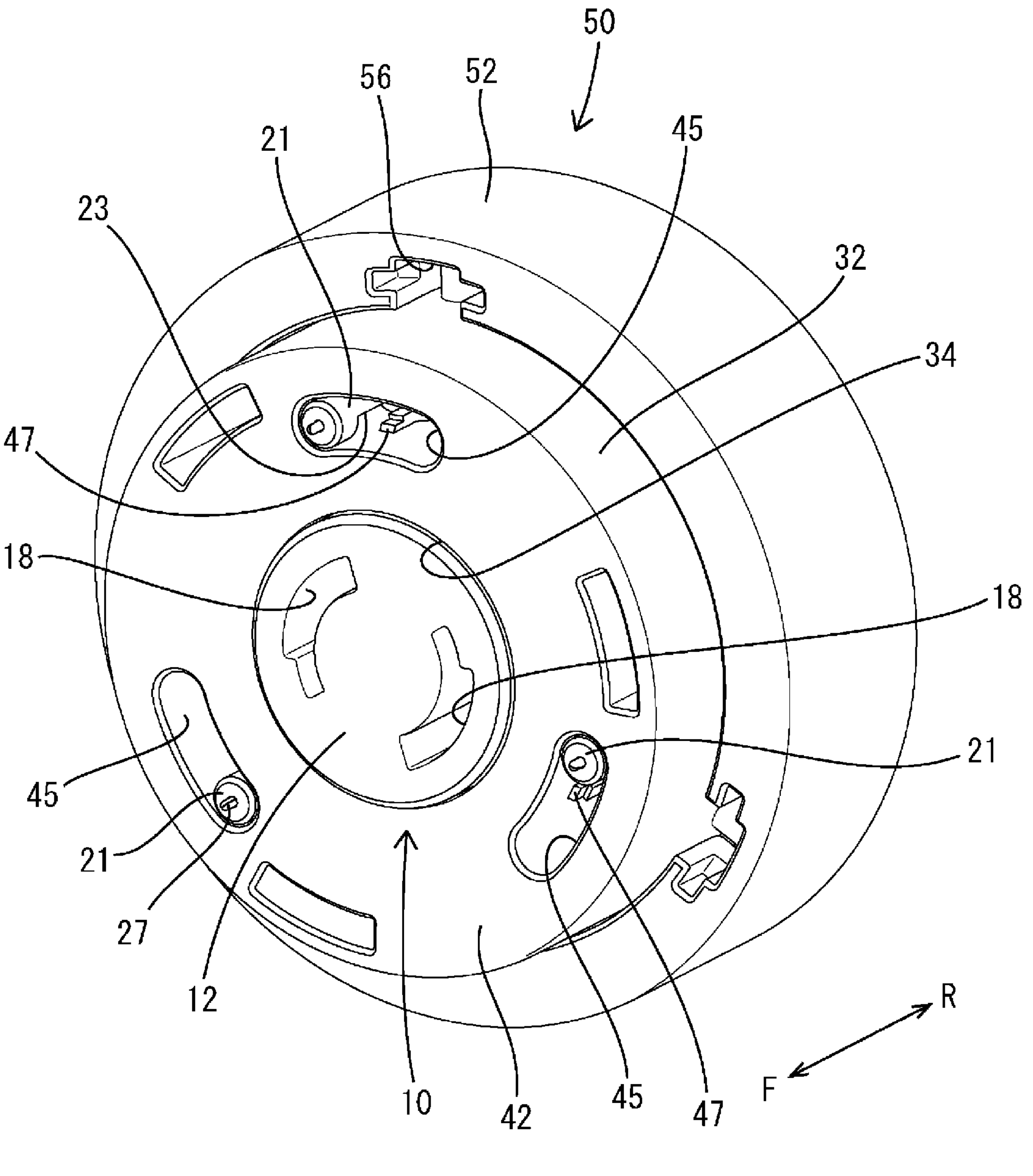
FIG. 1 is a perspective view of a connector of one embodiment when viewed obliquely from front.

First, embodiments of the present disclosure are listed and described.

(1) The connector of the present disclosure is provided with a housing including a terminal accommodation chamber, a terminal fitting to be inserted into the terminal accommodation chamber, and a retainer attached to the housing, the retainer being displaceable between a temporary locking position and a complete locking position, the retainer being formed with a resiliently deformable temporary locking portion arranged to face the terminal accommodation chamber at the temporary locking position and a complete locking portion arranged to face the terminal accommodation chamber at the complete locking position, the complete locking portion having a higher stiffness than the temporary locking portion, the temporary locking portion allowing insertion of the terminal fitting into the terminal accommodation chamber by being resiliently deformed and temporarily holding the terminal fitting in a retained state by locking the terminal fitting in the terminal accommodation chamber, and the complete locking portion holding the terminal fitting in a retained state by locking the terminal fitting inserted into the terminal accommodation chamber. According to the configuration of the present disclosure, since the temporary locking portion and the complete locking portion are formed in the retainer, it is not necessary to form the resiliently deformable temporary locking portion in the housing and the shape of the housing can be simplified. If the shape of the housing is simplified, there are less restrictions to ensure strength in a mold for molding the housing. Thus, the size reduction of the housing can be realized.

(2) Preferably, the terminal fitting is inserted into the terminal accommodation chamber from behind the housing, and the temporary locking portion has a cantilever shape extending forward and is arranged forward of the complete locking portion. According to this configuration, a molten resin flows better at the time of molding in the mold as compared to the case where the complete locking portion is arranged in the same region as the temporary locking portion in a front-rear direction.

(3) Preferably, the retainer is formed with a base portion extending in parallel to a movement path between the temporary locking position and the complete locking position, and the temporary locking portion and the complete locking portion are shaped to project from the base portion. According to this configuration, since the temporary locking portion and the complete locking portion are connected to the common base portion, the molten resin flows better at the time of molding in the mold.

(4) Preferably, the terminal accommodation chamber is formed inside a projection-like terminal accommodating portion, and the retainer is formed with a locking accommodation chamber for accommodating the terminal accommodating portion. According to this configuration, the interference of an external matter with the projection-like terminal accommodating portion can be prevented.

(5) Preferably in (4), the temporary locking portion and the complete locking portion are accommodated in the locking accommodation chamber. According to this configuration, the interference of an external matter with the temporary locking portion and the complete locking portion can be prevented.

(6) Preferably, the retainer and the housing have arcuate guide surfaces capable of sliding in contact with each other, and the retainer is displaced from the temporary locking position to the complete locking position while rotating by the guide surfaces sliding in contact with each other. When an external matter interferes to rub an outer surface of the retainer and an exposed surface of the housing, a direction of that interference is a linear direction. However, since a movement when the retainer is displaced from the temporary locking position to the complete locking position is a rotational movement, the retainer at the temporary locking position hardly moves to the complete locking position even if the external matter interferes to rub the retainer and the housing.

Details of Embodiment of Present Disclosure

Embodiment

One specific embodiment of a connector of the present disclosure is described with reference to FIGS. 1 to 15. Note that the present invention is not limited to these illustrations, but is represented by claims and intended to include all changes in the scope of claims and in the meaning and scope of equivalents. In this embodiment, a direction indicated by an arrow Fin FIGS. 1 to 3, 8, 11 and 15 is defined as a forward direction and a direction indicated by an arrow R is defined as a rearward direction concerning a front-rear direction.

Figure 2:
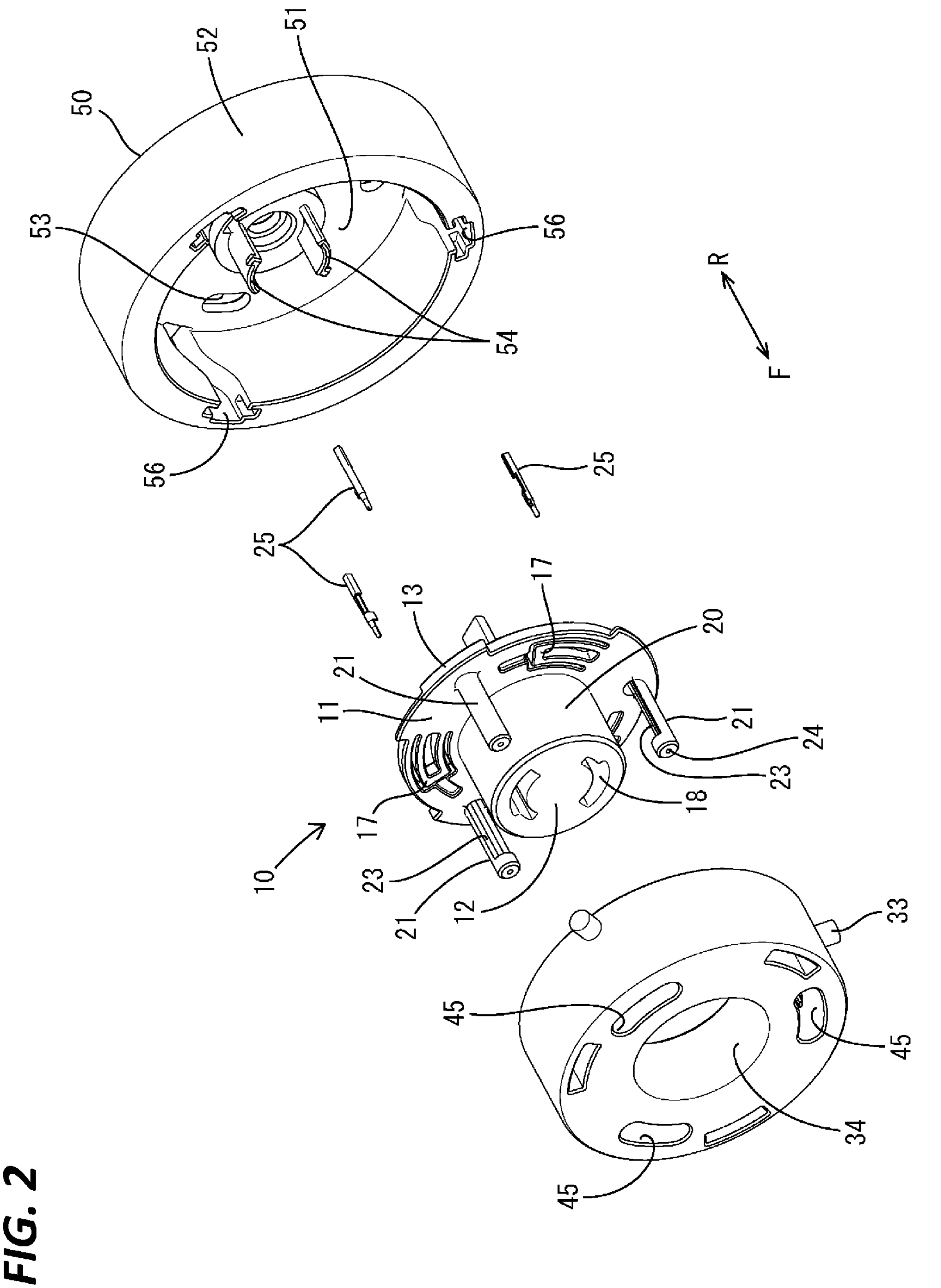
FIG. 2 is a perspective view of the connector in a disassembled state when viewed obliquely from front.
Figure 3:
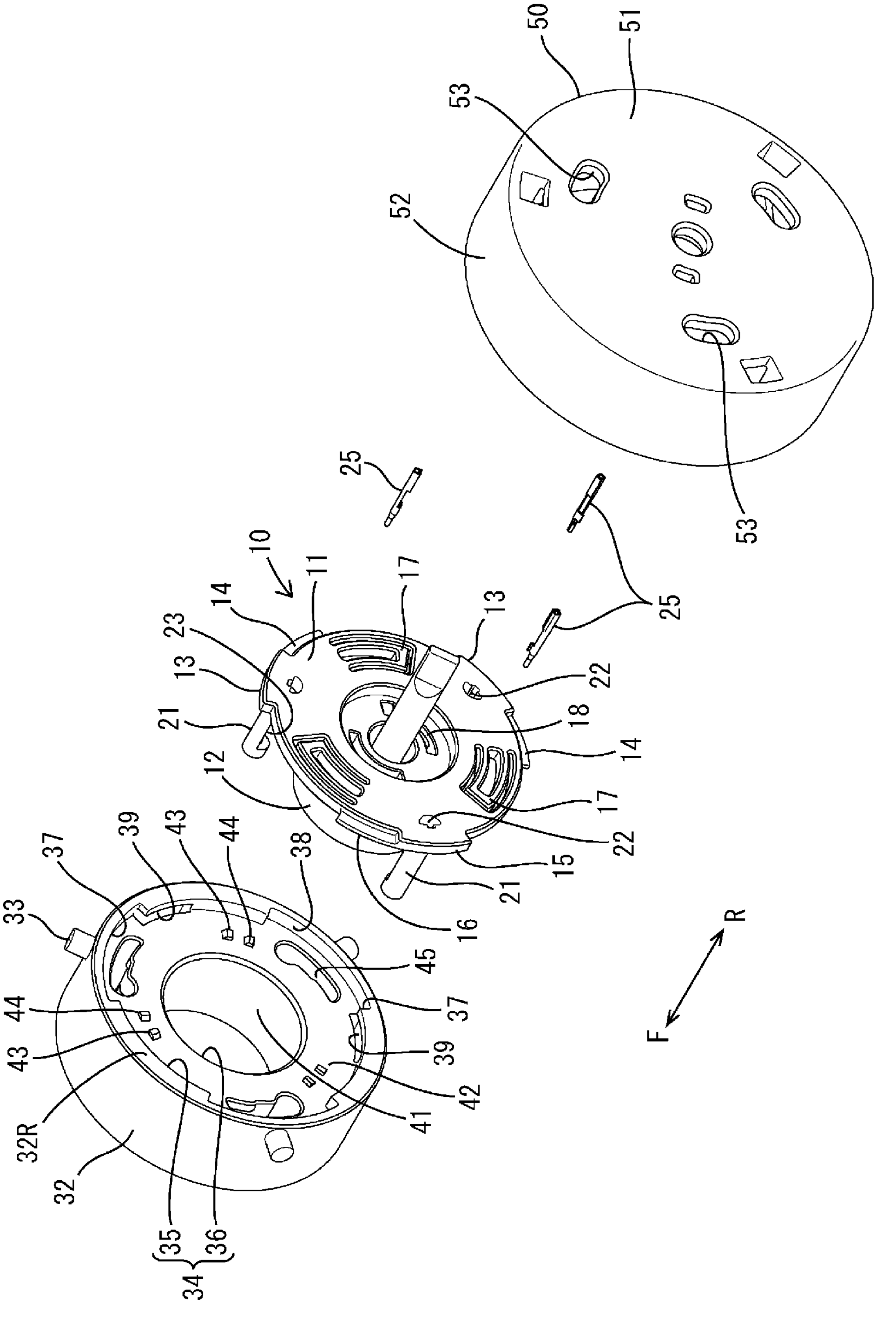
FIG. 3 is a perspective view of the connector in the disassembled state when viewed obliquely from behind.

As shown in FIGS. 1 to 3, a connector of this embodiment is provided with a housing 10, three terminal fittings 25, a retainer 32 and a cover 50.

The housing 10 is a single component made of synthetic resin. As shown in FIGS. 2 and 3, the housing 10 includes a disk portion 11, a cylindrical portion 12 and three terminal accommodating portions 21. The disk portion 11 is in the form of a plate having a plate thickness direction oriented in the front-rear direction. The disk portion 11 has a circular shape in a front view of the housing 10.

Figure 7:
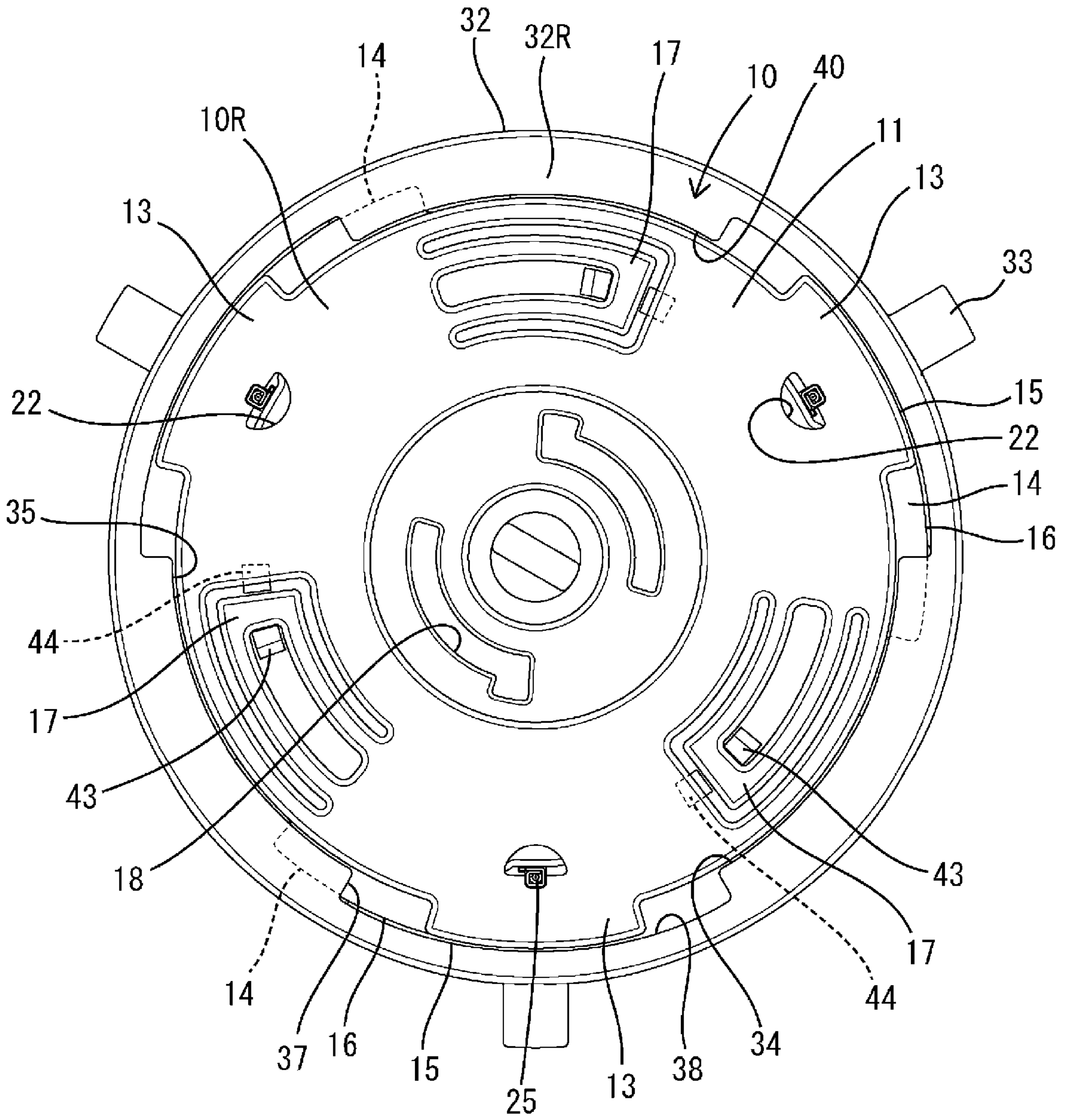
FIG. 7 is a back view showing the state where the retainer is at the temporary locking position.
Figure 10:
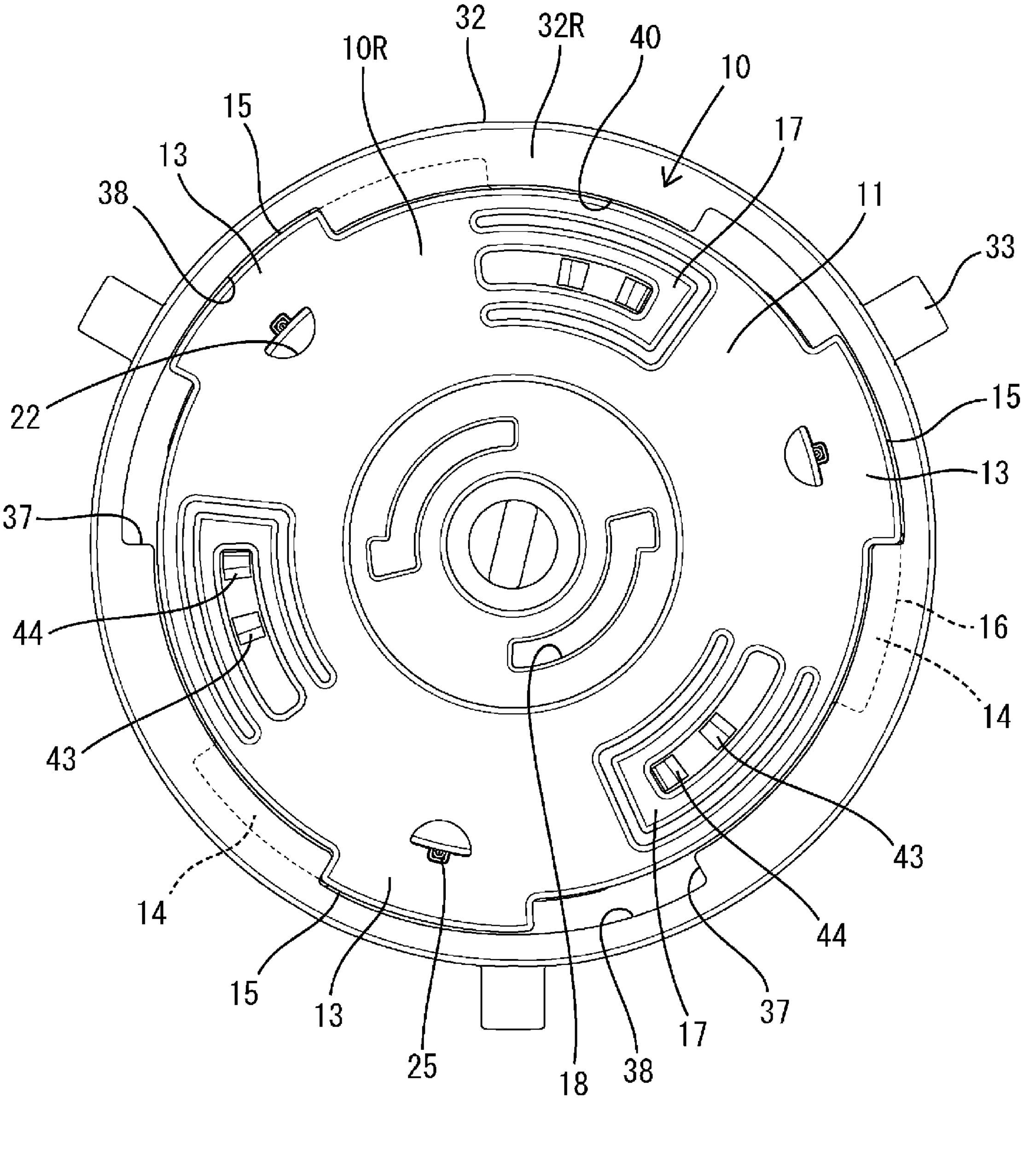
FIG. 10 is a back view showing the state where the retainer is at the complete locking position.

Three guide protrusions 13 and three retaining ribs 14 are formed on an outer peripheral edge part of the disk portion 11. The three guide protrusions 13 have an arc shape concentric with the disk portion 11 and are arranged at equal angular intervals in a circumferential direction. The rear surface of the guide protrusion 13 is continuous and flush with the disk portion 11, i.e. a rear surface 10R of the housing 10. As shown in FIGS. 7 and 10, the outer peripheral surface of the guide protrusion 13 functions as a first outer peripheral guide surface 15.

The three retaining ribs 14 have an arc shape concentric with the disk portion 11. In a back view of the housing 10, the retaining rib 14 is arranged adjacent to the guide protrusion 13 on a clockwise side. The rear surface of the retaining rib 14 is arranged to be recessed forward from the rear surfaces of the disk portion 11 and the guide protrusion 13. Regions where the guide protrusions 13 and the retaining ribs 14 are not formed, out of the outer peripheral surface of the disk portion 11, function as second outer peripheral guide surfaces 16.

The disk portion 11 is formed with three resilient holding pieces 17 arranged at equal angular intervals in the circumferential direction. The resilient holding piece 17 is arranged along the outer peripheral edge of the disk portion 11. The resilient holding piece 17 has an arc shape concentric with the disk portion 11 and is in the form of an arm cantilevered in a clockwise direction in the back view. In the front-rear direction, the front surface of the resilient holding piece 17 is at the same position as the front surface of the disk portion 11, and the rear surface of the resilient holding piece 17 is at the same position as the rear surface of the disk portion 11. The resilient holding piece 17 can be resiliently displaced in the front-rear direction with an end part on a counterclockwise side in the back view as a fulcrum.

Figure 13:
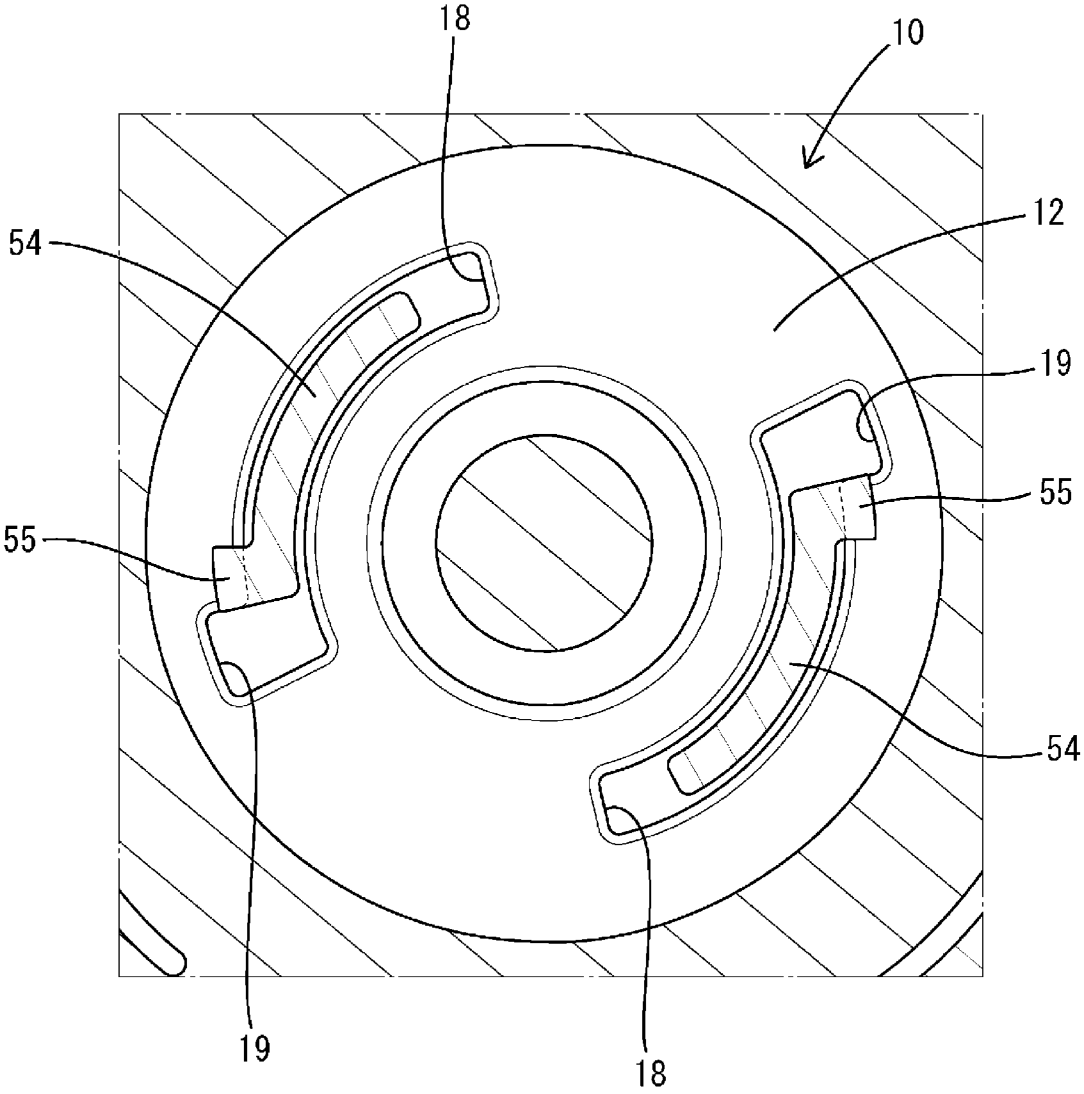
FIG. 13 is a partial enlarged back view in section showing a state where the cover is assembled with the retainer at the temporary locking position.
Figure 14:
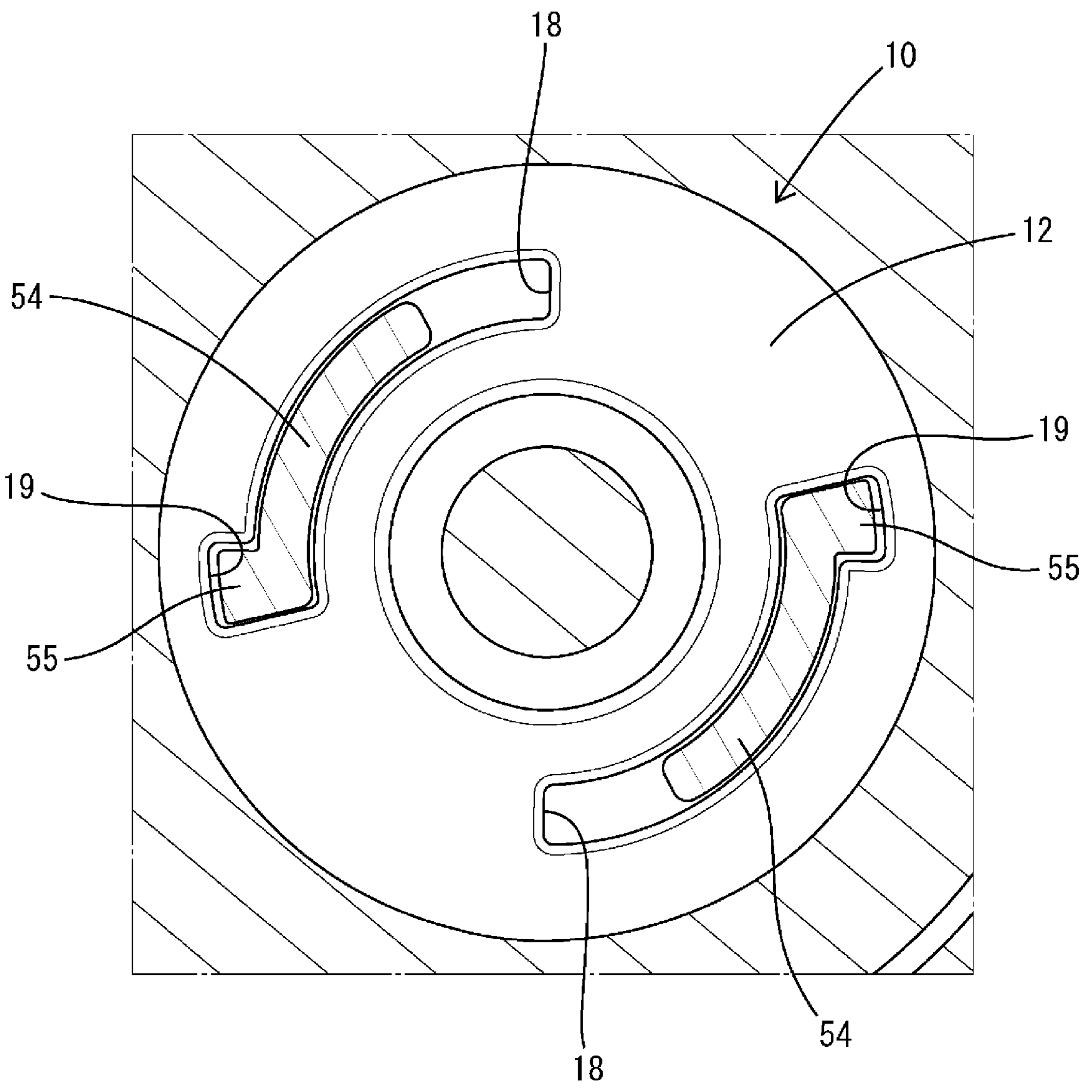
FIG. 14 is a partial enlarged back view in section showing the state where the cover is assembled with the retainer at the complete locking position.
Figure 15:
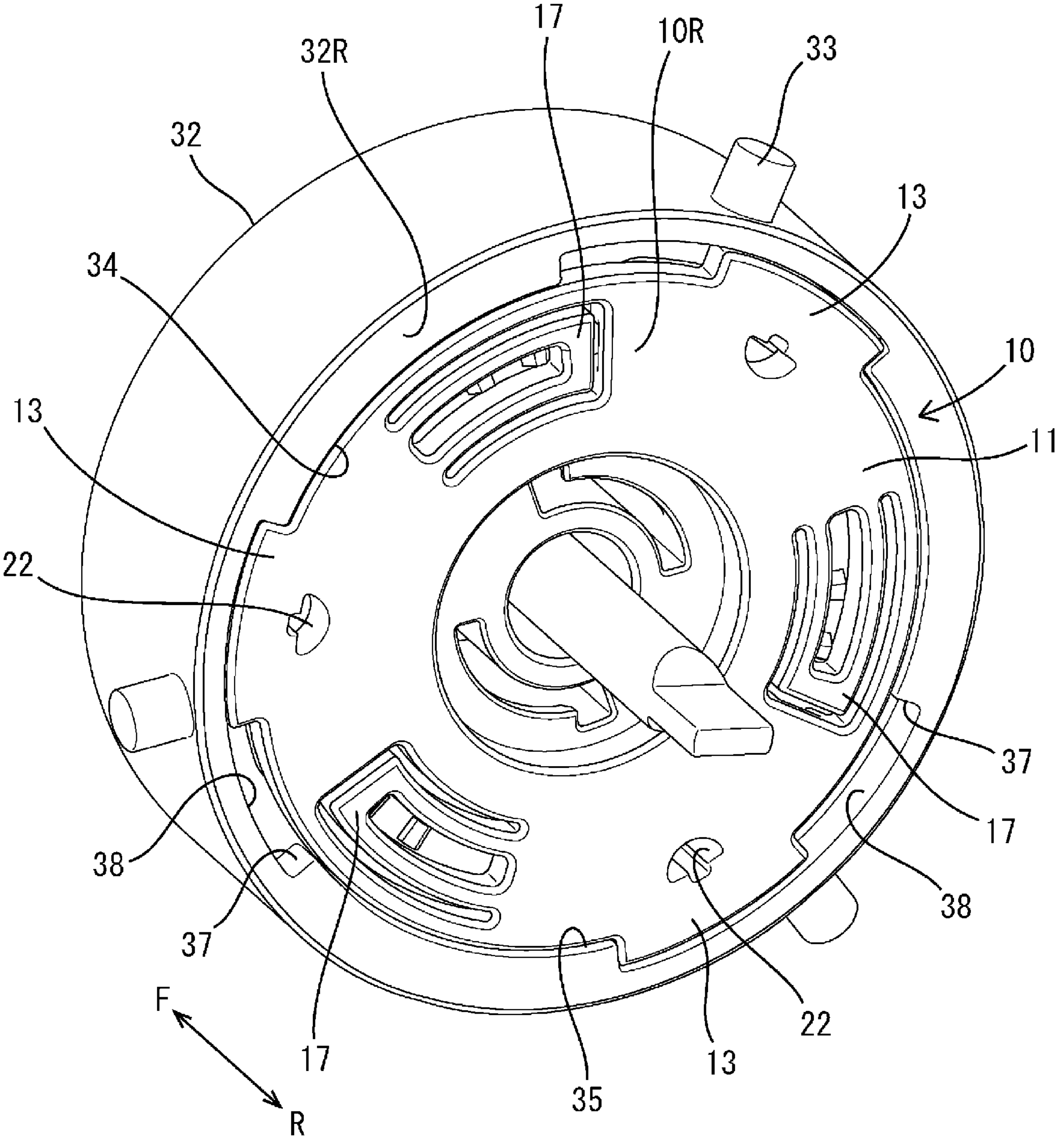
FIG. 15 is a perspective view of the connector when viewed obliquely from behind.

The cylindrical portion 12 has a cylindrical shape projecting forward concentrically with the disk portion 11 from the front surface of the disk portion 11. The cylindrical portion 12 is formed with two detection grooves 18 having an arc shape concentric with the cylindrical portion 12. As shown in FIGS. 13 and 14, a detection recess 19 recessed radially outward is formed on an end part on a counterclockwise side of the detection groove 18 in a back view. As shown in FIG. 2, the outer peripheral surface of the cylindrical portion 12 functions as a third outer peripheral guide surface 20.

Figure 8:
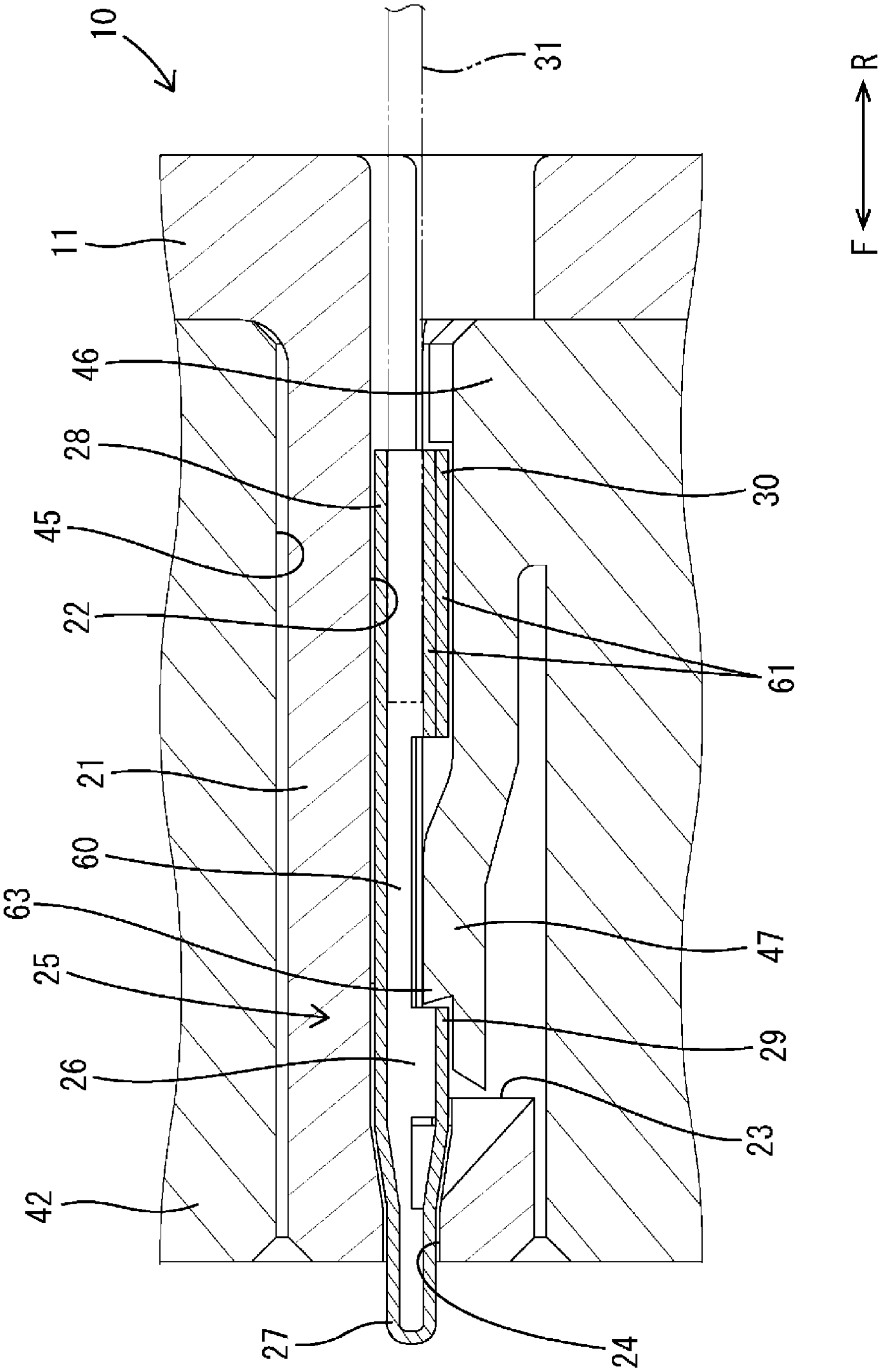
FIG. 8 is a partial enlarged side view in section showing a state where a locking lance retains a terminal fitting with the retainer held at the temporary locking position.
Figure 11:
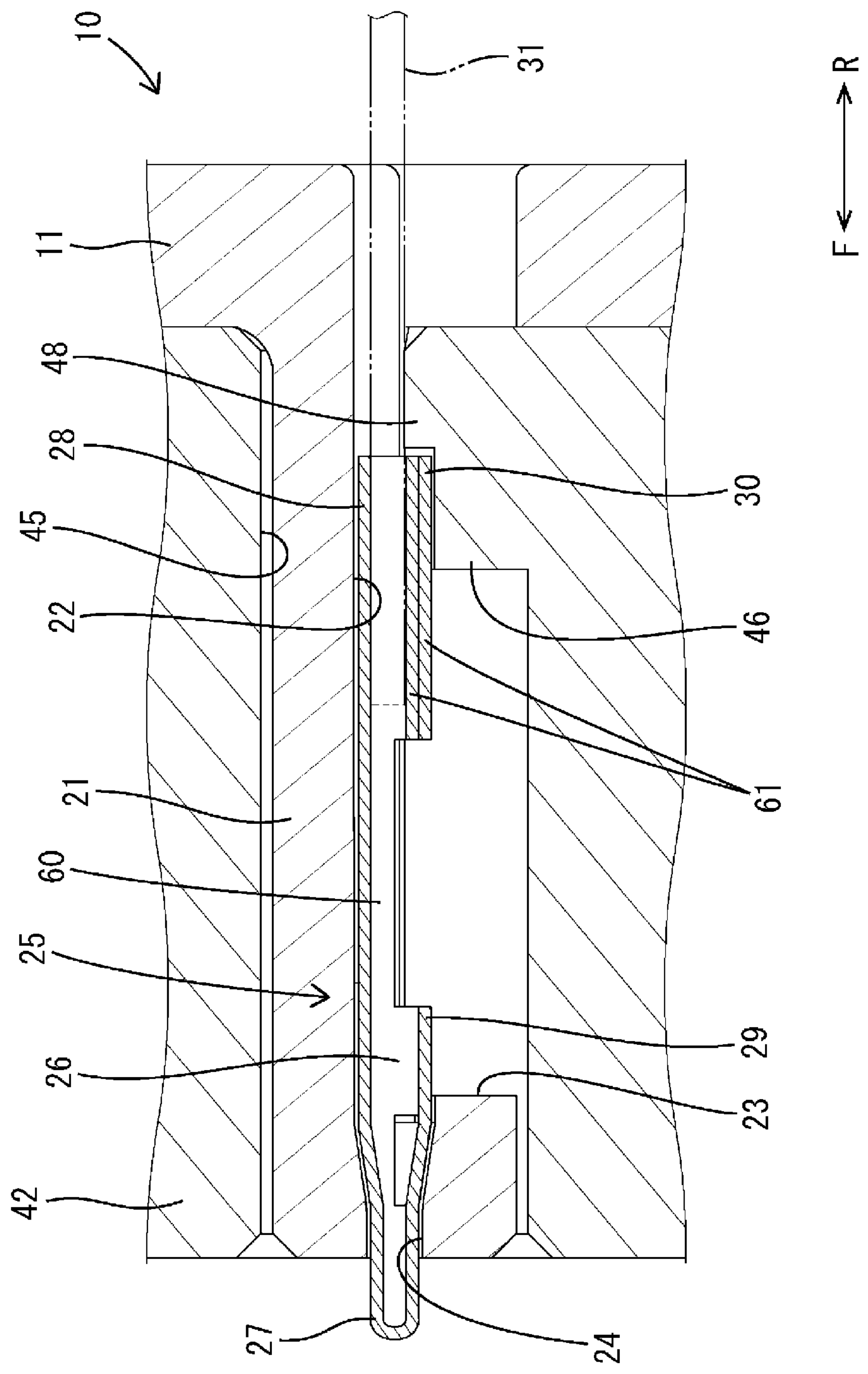
FIG. 11 is a partial enlarged side view in section showing a state where a complete locking portion retains the terminal fitting with the retainer held at the complete locking position.
Figure 12:
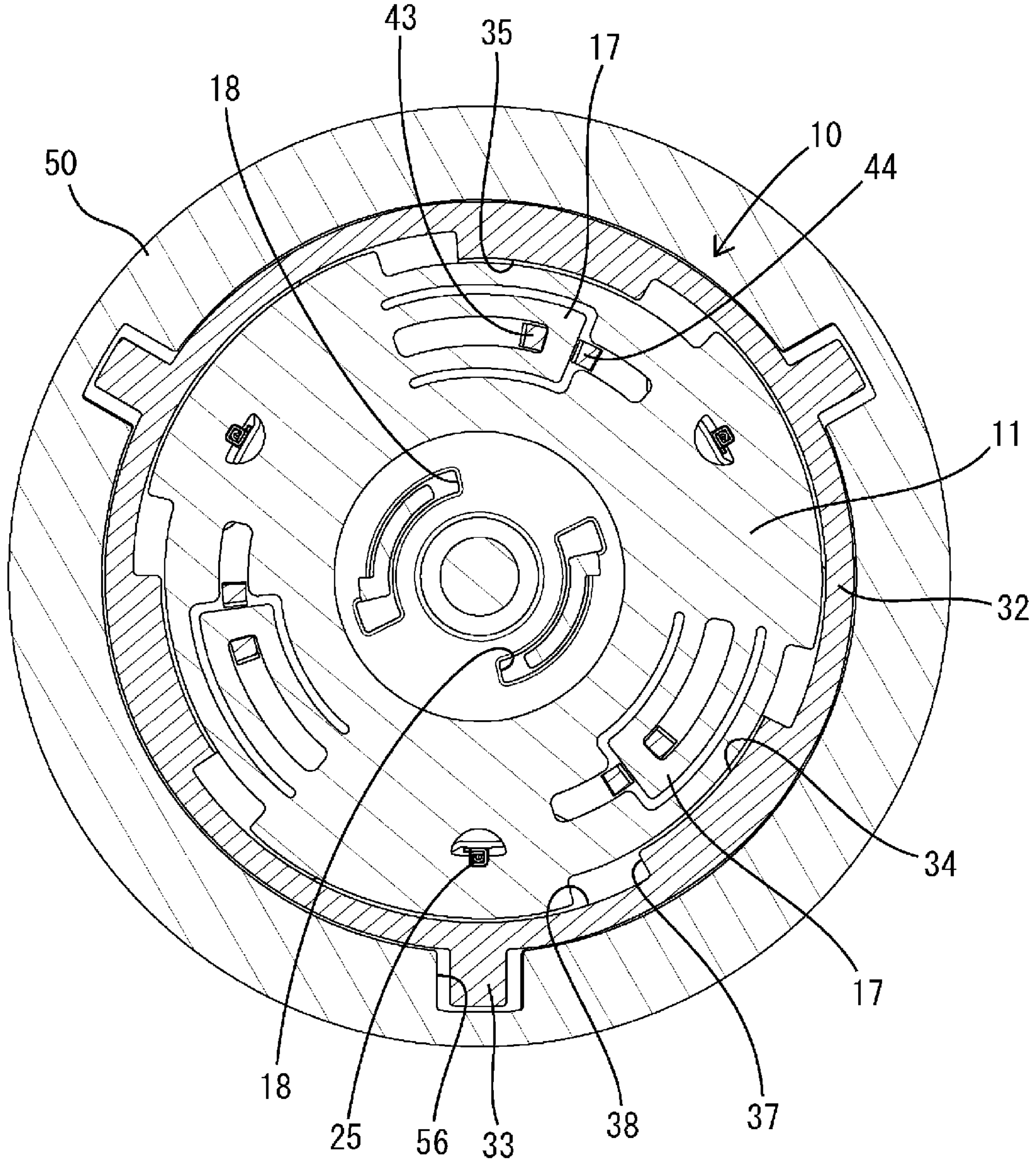
FIG. 12 is a back view in section showing a state where a cover is assembled with the retainer at the complete locking position.

The three terminal accommodating portions 21 are cantilevered forward from the front surface of the disk portion 11. The three terminal accommodating portions 21 are arranged at equal angular intervals in the circumferential direction on one circumference concentric with the disk portion 11. In a front view, the three terminal accommodating portions 21 are arranged to surround the cylindrical portion 12. The terminal accommodating portion 21 has a circular shape in a front view. As shown in FIGS. 8 and 11, a terminal accommodation chamber 22 open in the rear surface 10R of the housing 10 is formed inside the terminal accommodating portion 21.

As shown in FIGS. 2 and 3, a cut portion 23 for opening the inside of the terminal accommodation chamber 22 to the outside of the terminal accommodating portion 21 is formed in a region facing the cylindrical portion 12, out of the outer peripheral surface of the terminal accommodating portion 21. As shown in FIGS. 8 and 11, a formation range of the cut portion 23 in the front-rear direction is a region of the terminal accommodation chamber 22 except front and rear end parts. The inner peripheral surface of the terminal accommodation chamber 22 is connected over an entire circumference in the front and rear end parts of the terminal accommodation chamber 22. A through hole 24 penetrating into the terminal accommodation chamber 22 from the front end surface of the terminal accommodating portion 21 is formed in the front end part of the terminal accommodating portion 21.

As shown in FIGS. 8 and 11, the terminal fitting 25 has a shape elongated in the front-rear direction as a whole. The terminal fitting 25 includes a tubular terminal body portion 26, a connecting portion 27, a crimping portion 28 and a linking portion 60. The connecting portion 27 is cantilevered forward from the front end of the terminal body portion 26. The linking portion 60 extends rearward from the rear end of the terminal body portion 26. The linking portion 60 is recessed further radially outward of the disk portion than the terminal body portion 26. A stepped primary locking portion 29 is formed in a rear end part of the terminal body portion 26 by the recessed shape of the linking portion 60.

The crimping portion 28 has a tubular shape and extends rearward from the rear end of the linking portion 60. The crimping portion 28 is connected to a front end part of a wire 31 by crimping. The crimping portion 28 is a part in the form of an open barrel including a pair of crimping pieces 61. The pair of crimping pieces 61 are radially overlapped in a region radially inward of the disk portion 11, out of the outer peripheral surface of the wire 31. A rear end part of a location of the crimping portion 28 where the pair of crimping pieces 61 are overlapped functions as a secondary locking portion 30.

Figure 4:
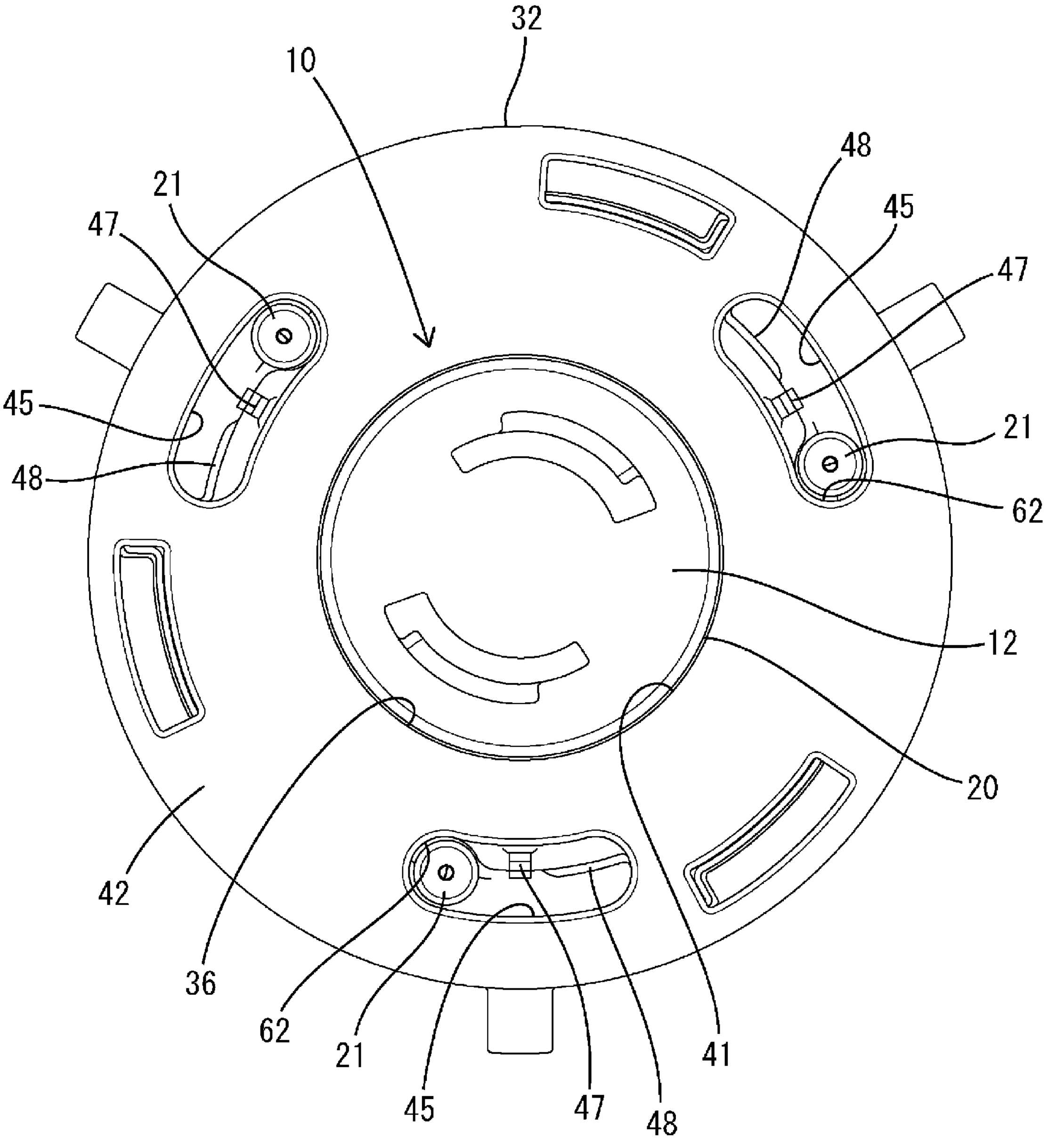
FIG. 4 is a front view showing a state where a housing and a retainer are assembled.

The retainer 32 is a single component made of synthetic resin. As shown in FIG. 4, the retainer 32 has an annular shape in a front view. Three guide pins 33 are formed on the outer peripheral surface of the retainer 32. The three guide portions 33 are arranged at equal angular intervals in the circumferential direction and radially project.

The retainer 32 is formed with an accommodation recess 34 for accommodating the housing 10. The accommodation recess 34 penetrates through the retainer 32 in the front-rear direction. The accommodation recess 34 includes one large-diameter recess 35, one small-diameter recess 36 and three locking accommodation chambers 45. The large-diameter recess 35 is shaped by shallowly recessing a rear surface 32R of the retainer 32.

The large-diameter recess 35 has a circular shape concentric with the retainer 32. An inner diameter of the large-diameter recess 35 is slightly smaller than an outer diameter of the retainer 32. Three guide recesses 37 arranged at equal angular intervals in the circumferential direction are formed in the inner peripheral surface of the large-diameter recess 35. The guide recess 37 has an arc shape concentric with the retainer 32 and is open in the rear surface 32R of the retainer 32. The inner peripheral surface of the guide recess 37 functions as a first inner peripheral guide surface 38 having an arc shape.

Figure 5:
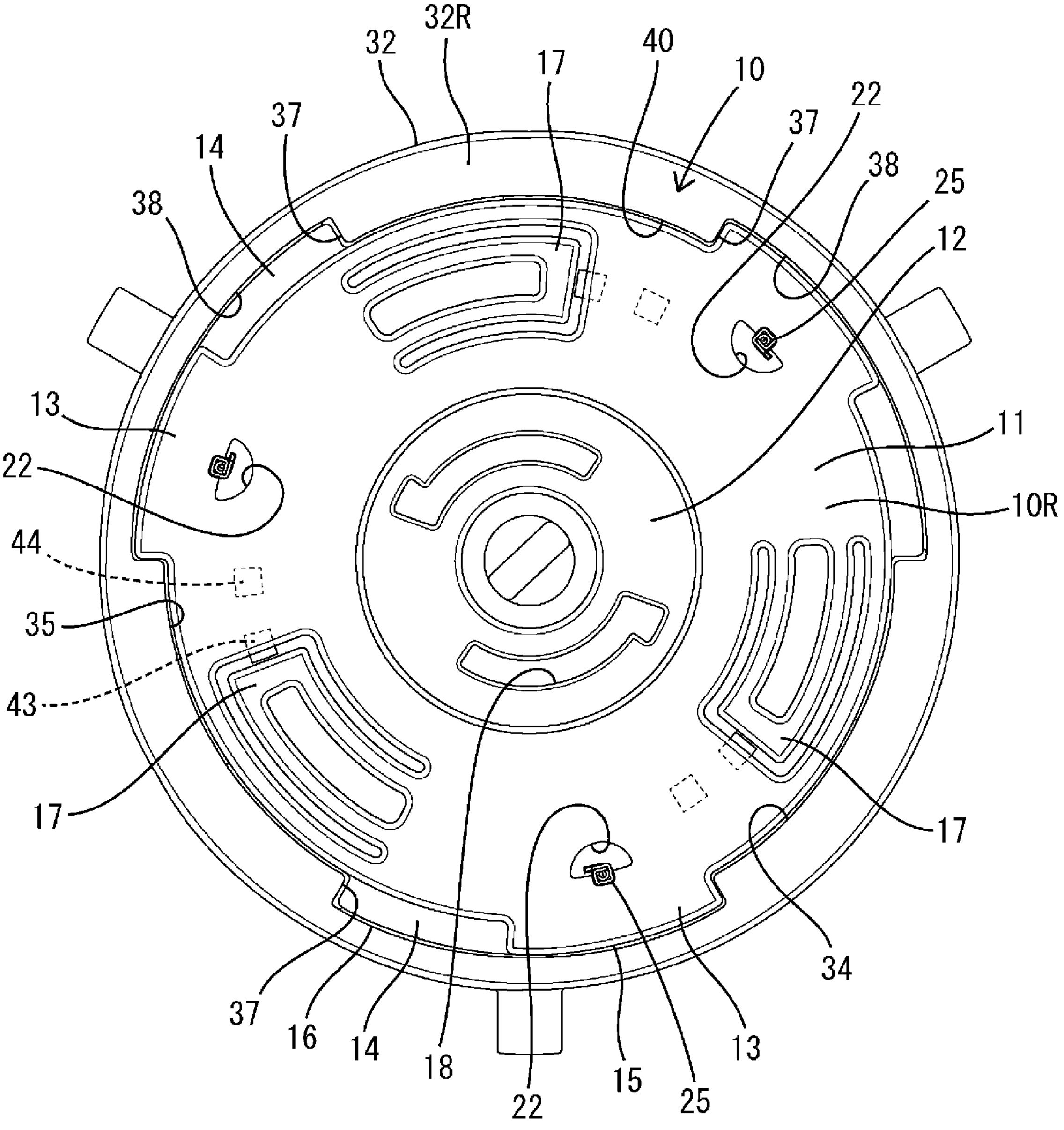
FIG. 5 is a back view showing the state where the housing and the retainer are assembled.

Retaining groove portions 39 recessed into a slit are formed in regions where the guide recesses 37 are not formed, out of the inner peripheral surface of the large-diameter recess 35, as shown in FIG. 3. As shown in FIGS. 5 and 7, the retaining groove portion 39 is arranged adjacent to the guide recess 37 on a clockwise side in a back view. In the back view, an end part of the retaining groove portion 39 on a counterclockwise side communicates with the guide recess 37. Regions where the guide recesses 37 and the retaining groove portions 39 are not formed, out of the inner peripheral surface of the large-diameter recess 35, function as second inner peripheral guide surfaces 40.

The small-diameter recess 36 is shaped to penetrate from the large-diameter recess 35 to the front end surface of the retainer 32. The small-diameter recess 36 has a circular shape concentric with the retainer 32 and the large-diameter recess 35. The inner peripheral surface of the small-diameter recess 36 functions as a third inner peripheral guide surface 41.

As shown in FIG. 3, a part of the retainer 32 surrounding the small-diameter recess 36 functions as an annular portion 42. The rear surface of the annular portion 42 is facing the inside of the large-diameter recess 35. The rear surface of the annular portion 42 is formed with three pairs of holding projections 43, 44 arranged at equal angular intervals in the circumferential direction. A pair of the holding projections 43, 44 are composed of a first holding projection 43 and a second holding projection 44 spaced apart in the circumferential direction. In a back view, the second holding projection 44 is arranged on a clockwise side of the first holding projection 43.

Figure 6:
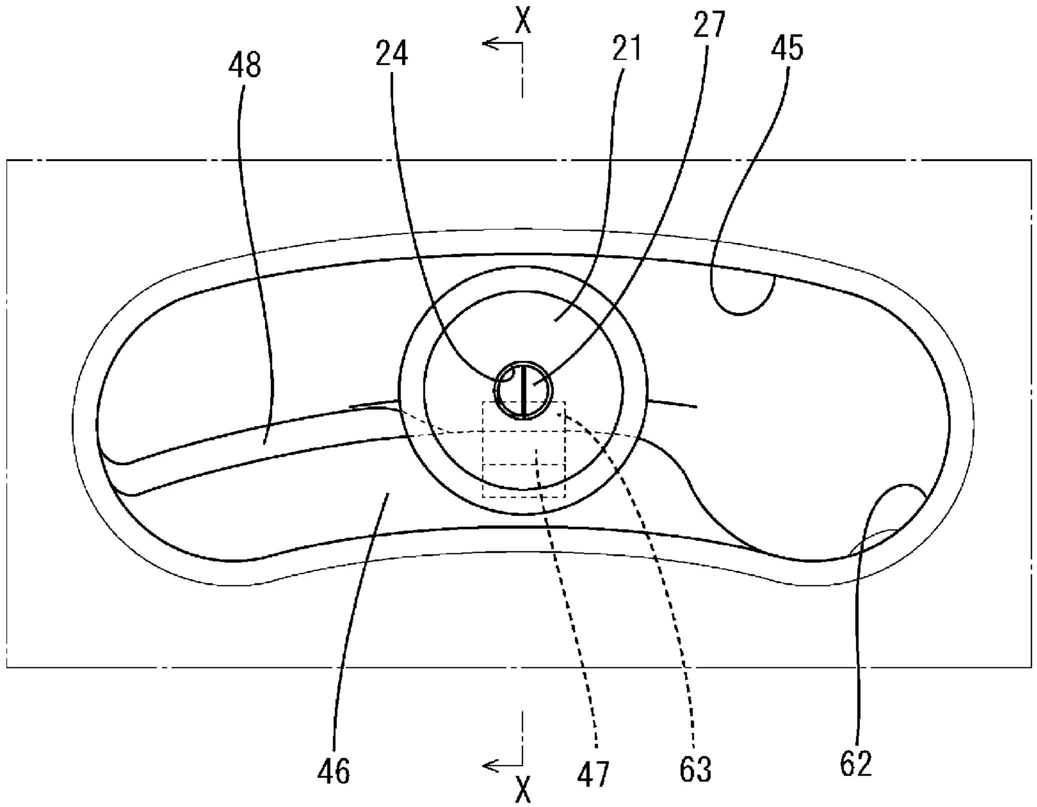
FIG. 6 is a partial enlarged front view showing a state where the retainer is at a temporary locking position.
Figure 9:
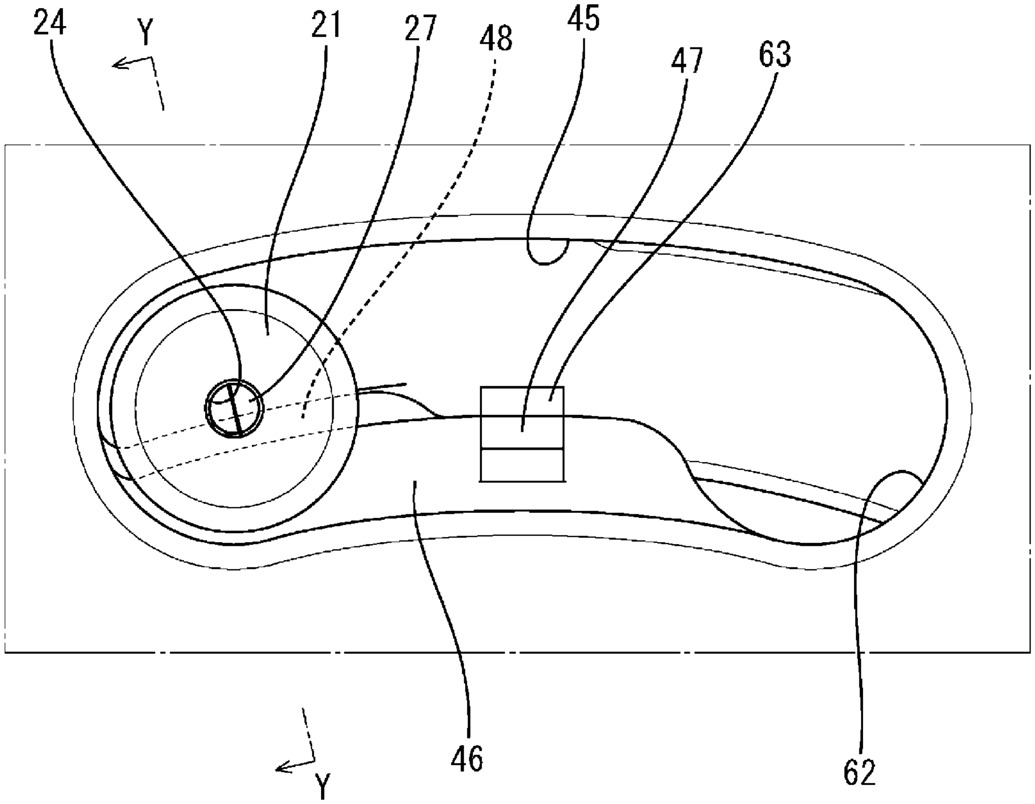
FIG. 9 is a partial enlarged front view showing a state where the retainer is at a complete locking position.

The three locking accommodation chambers 45 are formed in the annular portion 42 and arranged at equal angular intervals in the circumferential direction. The locking accommodation chamber 45 penetrates through the annular portion 42 in the front-rear direction. As shown in FIGS. 4, 6 and 9, each locking accommodation chamber 45 is shaped by curving an ellipse to have an arc shape concentric with the accommodation recess 34 in a front view.

A base portion 46 having an arc shape, a locking lance 47 functioning as a temporary locking portion and a complete locking portion 48 are formed in the locking accommodation chamber 45. As shown in FIGS. 6 and 9, the base portion 46 protrudes radially outward to have a concentric arc shape from a radially inner arcuate surface on the inner surface of the locking accommodation chamber 45. The base portion 46 is arranged in a rear end part of the locking accommodation chamber 45. A formation range of the base portion 46 in the circumferential direction is a region of the locking accommodation chamber 45 except an end part on the clockwise side in the front view. A space where the base portion 46 is not formed, out of the locking accommodation chamber 45, functions as an insertion space 62 having a circular shape in the front view.

The locking lance 47 is arranged in a central part in the circumferential direction of the base portion 46. The locking lance 47 is cantilevered forward from the front surface of the base portion 46. The locking lance 47 can be resiliently displaced in a radial direction with a rear end part of the locking lance 47 as a fulcrum. A retaining projection 63 is formed on the outer surface of the locking lance 47 in a radial direction of the retainer 32. The locking lance 47 is a part for temporarily holding the terminal fitting 25 by being locked to the primary locking portion 29 of the terminal fitting 25.

The complete locking portion 48 is in the form of a rib protruding radially outward from a radially outer surface of the base portion 46. The complete locking portion 48 has an arc shape concentric with the retainer 32 and the base portion 46 in a front view. The complete locking portion 48 is located in a rear end part of the base portion 46 and arranged behind the locking lance 47. A formation range of the complete locking portion 48 in the circumferential direction is a region on a counterclockwise side of the locking lance 47 in the front view. Unlike the locking lance 47, the complete locking portion 48 is not resiliently deformed. The complete locking portion 48 is a part for holding the terminal fitting 25 in a retained state by being locked to the secondary locking portion 30 of the terminal fitting 25.

The cover 50 is a single component made of synthetic resin. As shown in FIGS. 2 and 3, the cover 50 includes a circular rear wall portion 51 and a hollow cylindrical peripheral wall portion 52 projecting forward from the outer peripheral edge of the rear wall portion 51. The rear wall portion 51 is formed with three wire insertion holes 53 arranged at equal angular intervals in the circumferential direction. The rear wall portion 51 is formed with two detecting portions 54 having an arc shape concentric with the rear wall portion 51. The detecting portion 54 projects forward from the rear wall portion 51. As shown in FIGS. 13 and 14, a detecting projection 55 projecting radially outward is formed on an end part of the detecting portion 54 on the clockwise side in a back view. Three guide grooves 56 arranged at equal angular intervals in the circumferential direction are formed in the inner peripheral surface of the peripheral wall portion 52. A front end part of the guide groove 56 is open in the front surface of the peripheral wall portion 52.

Next, an assembly procedure of the connector of this embodiment is described. First, the housing 10 having the terminal fittings 25 not mounted therein yet is accommodated into the accommodation recess 34 from behind the retainer 32. At this time, the cylindrical portion 12 is fit into the short-diameter recess 36, the disk portion 11 is accommodated into the large-diameter recess 35, and the terminal accommodating portions 21 are accommodated into the locking accommodation chambers 45. The retainer 32 and the housing 10 are positioned in the circumferential direction by fitting the guide protrusions 13 and the retaining ribs 14 into the guide recesses 37. The terminal accommodating portion 21 is accommodated into the insertion space 62 further on the clockwise side than the base portion 46 and the locking lance 47 in the front view, out of the locking accommodation chamber 45.

From this state, the retainer 32 is relatively rotated in the clockwise direction in the front view with respect to the housing 10. At this time, the first outer peripheral guide surfaces 15, the second outer peripheral guide surfaces 16 and the third outer peripheral guide surface 20 slide in contact with the first inner peripheral guide surfaces 38, the second inner peripheral guide surfaces 40 and the third inner peripheral guide surface 41. The retainer 32 and the housing 10 are relatively smoothly rotated by a guiding action brought about by the slide contact of these.

If the housing 10 and the retainer 32 are relatively rotated, the retaining ribs 14 are fit into the retaining groove portions 39, whereby the retainer 32 is restricted from being separated forward with respect to the housing 10. If the retainer 32 is rotated to the temporary locking position (position where the terminal accommodating portions 21 cover the locking lances 47 from radially outer sides), the first and second holding projections 43, 44 are locked to the resilient holding pieces 17 to sandwich the resilient holding pieces 17 in the circumferential direction as shown in FIG. 7. By this locking action, the retainer 32 is held at the temporary locking position with respect to the housing 10.

Subsequently, the terminal fittings 25 are inserted into the terminal accommodation chambers 22 from behind the housing 10. In an insertion process, the terminal body portion 26 interferes with the retaining projection 63 of the locking lance 47, whereby the locking lance 47 is resiliently displaced radially inward. If the terminal fitting 25 is inserted to a proper position, the locking lance 47 resiliently returns and the retaining projection 63 is locked to the primary locking portion 29 of the terminal fitting 25 from behind. By locking the locking lance 47 to the primary locking portion 29, the terminal fitting 25 is retained. With the terminal fitting 25 inserted to the proper position, the connecting portion 27 is fit in the through hole 24. A front end part of the connecting portion 27 projects further forward than the front surface of the terminal accommodating portion 21.

After the three terminal fittings 25 are inserted into the terminal accommodation chambers 22, the retainer 32 is relatively rotated in the clockwise direction in the front view with respect to the housing 10. If the retainer 32 is rotated to the complete locking position, the retaining ribs 14 come into contact with back end parts of the retaining groove portions 39 and the second holding projections 44 are locked to the resilient holding pieces 17, whereby the retainer 32 is held at the complete locking position. With the retainer 32 held at the complete locking position, the primary locking portions 29 of the terminal fittings 25 and the locking lances 47 of the retainer 32 are separated and the complete locking portions 48 are locked to the secondary locking portions 30 of the terminal fittings 25 from behind. The terminal fittings 25 are retained by the locking action of the complete locking portions 48 and the secondary locking portions 30.

After the retainer 32 is rotated to the complete locking position, the cover 50 is assembled with the retainer 32 from behind the housing 10. In assembling, the guide grooves 56 are fit to the guide pins 33, whereby the retainer 32 and the cover 50 are positioned in the circumferential direction. If the cover 50 is brought closer to the retainer 32, the detecting portions 54 are fit into the detection grooves 18 and the detecting projections 55 are fit into the detection recesses 19 as shown in FIG. 14. Note that the wires 31 are inserted through the wire insertion holes 53 in advance.

If the retainer 32 is left at the temporary locking position when the cover 50 is mounted, the detecting projections 55 are deviated from the detection recesses 19 and interfere with opening edge parts of the detection grooves 18 as shown in FIG. 13. Since the cover 50 cannot be assembled with the retainer 32 due to this interference, it is clear that the retainer 32 is left at the temporary locking position, i.e. the retainer 32 has not been moved to the complete locking position.

The connector of this embodiment is provided with the housing 10 including the terminal accommodation chambers 22, the terminal fittings 25 to be inserted into the terminal accommodation chambers 22 and the retainer 32. The retainer 32 is attached to the housing 10 and relatively displaceable between the temporary locking position and the complete locking position.

The retainer 32 is integrally formed with the locking lances 47 serving as temporary locking portions and the complete locking portions 48. The locking lance 47 is resiliently deformable and arranged to face the terminal accommodation chamber 22 with the retainer 32 held at the temporary locking position. The locking lance 47 allows the insertion of the terminal fitting 25 into the terminal accommodation chambers 22 by being resiliently deformed. The locking lance 47 temporarily holds the terminal fitting 25 in the retained state by locking the terminal fitting 25 inserted into the terminal accommodation chamber 22.

The complete locking portion 48 is not resiliently deformed and has a higher stiffness than the locking lance 47. The complete locking portion 48 is arranged to face the terminal accommodation chamber 22 with the retainer 32 held at the complete locking position. The complete locking portion 48 holds the terminal fitting 25 in the retained state with a higher holding force than the locking lance 47 by locking the terminal fitting 25 inserted into the terminal accommodation chamber 22.

According to the connector of this embodiment, if the terminal fitting 25 is inserted into the terminal accommodation chamber 22 with the retainer 32 held at the temporary locking position, the terminal fitting 25 can be temporarily held by the locking action of the locking lance 47. If the retainer 32 is displaced to the complete locking position after the insertion of the terminal fittings 25, the terminal fittings 25 are held in the retained state by the locking action of the complete locking portions 48.

Since the locking lances 47 and the complete locking portions 48 are formed in the retainer 32, it is not necessary to form the resiliently deformable locking lances 47 in the housing 10 and the shape of the terminal accommodation chambers 22 of the housing 10 can be simplified. If the shape of the housing 10 is simplified, there are less restrictions to ensure strength in a mold for molding the housing 10. Thus, the size reduction of the housing 10 can be realized. Since the retainer 32 has a simpler shape than the housing 10, the shape of the retainer 32 does not become complicated even if the locking lances 47 and the complete locking portions 48 are formed.

The terminal fitting 25 is inserted into the terminal accommodation chamber 22 from behind the housing 10. The locking lance 47 is cantilevered forward and arranged forward of the complete locking portion 48. According to this configuration, a molten resin flows better at the time of molding in the mold as compared to the case where the complete locking portions 48 are arranged in the same region as the locking lances 47 in the front-rear direction.

The retainer 32 is formed with the base portions 46 extending in parallel to a movement path between the temporary locking position and the complete locking position. The locking lance 47 and the complete locking portion 48 are shaped to project from the base portion 46. According to this configuration, since the locking lance 47 and the complete locking portion 48 are both connected to the common base portion 46, the molten resin flows better at the time of molding in the mold.

The terminal accommodation chamber 22 is formed inside the projection-like terminal accommodating portion 21. The retainer 32 is formed with the locking accommodation chambers 45 for accommodating the terminal accommodating portions 21. According to this configuration, the interference of an external matter with the projection-like terminal accommodating portion 21 can be prevented. Since the locking lance 47 and the complete locking portion 48 are accommodated in the locking accommodation chamber 45, the interference of the external matter with the locking lance 47 and the complete locking portion 48 can be prevented.

The inner peripheral surface of the accommodation recess 34 has the first to third inner peripheral guide surfaces 38, 40 and 41 having an arc shape, and the outer peripheral surface of the housing 10 has the first to third outer peripheral guide surfaces 15, 16 and 20 having an arc shape. The first to third inner peripheral guide surfaces 38, 40 and 41 and the first to third outer peripheral guide surfaces 15, 16 and 20 individually slide in contact with each other. The retainer 32 is displaced from the temporary locking position to the complete locking position while rotating by the slide contact of these.

When an external matter interferes to rub the rear surface 32R of the retainer 32 and the rear surface 10R of the housing 10, a direction of that interference is a linear direction. In contrast, a movement when the retainer 32 is displaced from the temporary locking position to the complete locking position is a rotational movement. Therefore, even if the external matter interferes to rub the rear surface 32R of the retainer 32 and the rear surface 10R of the housing 10, the retainer 32 at the temporary locking position hardly moves to the complete locking position.

Other Embodiments

The present invention is not limited to the above described and illustrated embodiment, but is represented by claims. The present invention is intended to include all changes in the scope of claims and in the meaning and scope of equivalents and also include the following embodiments.

Although the temporary locking portion (locking lance) is cantilevered forward in the above embodiment, the temporary locking portion may be cantilevered rearward or both front and rear ends thereof may be supported on the retainer.

Although the temporary locking portion (locking lance) is entirely arranged forward of the complete locking portion in the above embodiment, a part of the temporary locking portion may be arranged in the same region as the complete locking portion in the front-rear direction.

Although the retainer is formed with the base portions extending in parallel to the movement path between the temporary locking position and the complete locking position in the above embodiment, the retainer may be shaped not to include such base portions.

Although the retainer is displaced from the temporary locking position to the complete locking position while rotating in the above embodiment, the movement path of the retainer from the temporary locking position to the complete locking position may be linear.

LIST OF REFERENCE NUMERALS

10 . . . housing
10R . . . rear surface of housing (exposed surface of other member)
11 . . . disk portion
12 . . . cylindrical portion
13 . . . guide protrusion
14 . . . retaining rib
15 . . . first outer peripheral guide surface (guide surface)
16 . . . second outer peripheral guide surface (guide surface)
17 . . . resilient holding piece
18 . . . detection groove
19 . . . detection recess
20 . . . third outer peripheral guide surface (guide surface)
21 . . . terminal accommodating portion
22 . . . terminal accommodation chamber
23 . . . cut portion
24 . . . through hole
25 . . . terminal fitting
26 . . . terminal body portion
27 . . . connecting portion
28 . . . crimping portion
29 . . . primary locking portion
30 . . . secondary locking portion
31 . . . wire
32 . . . retainer
32R . . . rear surface of retainer
33 . . . guide pin
34 . . . accommodation recess
35 . . . large-diameter recess
36 . . . small-diameter recess
37 . . . guide recess
38 . . . first inner peripheral guide surface (guide surface)
39 . . . retaining groove portion
40 . . . second inner peripheral guide surface (guide surface)
41 . . . third inner peripheral guide surface (guide surface)
42 . . . annular portion
43 . . . first holding projection
44 . . . second holding projection
45 . . . locking accommodation chamber
46 . . . base portion
47 . . . locking lance (temporary locking portion)
48 . . . complete locking portion
50 . . . cover
51 . . . rear wall portion
52 . . . peripheral wall portion
53 . . . wire insertion hole
54 . . . detecting portion
55 . . . detecting projection
56 . . . guide groove
60 . . . linking portion
61 . . . crimping piece
62 . . . insertion space
63 . . . retaining projection

What is claimed is:

1. A connector, comprising:

a housing including a terminal accommodation chamber;

a terminal fitting to be inserted into the terminal accommodation chamber; and a retainer attached to the housing, the retainer being displaceable between a temporary locking position and a complete locking position and being formed by:

a temporary locking portion arranged to face the terminal accommodation chamber at the temporary locking position, and a complete locking portion arranged to face the terminal accommodation chamber at the complete locking position, the complete locking portion having a higher stiffness than the temporary locking portion, wherein the temporary locking portion is resiliently deformable and is configured to allow insertion of the terminal fitting into the terminal accommodation chamber by being resiliently deformed and to hold temporarily the terminal fitting in a retained state by locking the terminal fitting in the terminal accommodation chamber, wherein the complete locking portion is configured to hold the terminal fitting in a retained state by locking the terminal fitting inserted into the terminal accommodation chamber, and wherein the retainer and the housing have arcuate guide surfaces configured to slide while in contact with each other, the retainer being displaced from the temporary locking position to the complete locking position while rotating by the guide surfaces sliding in contact with each other.

2. The connector of claim 1, wherein:

the terminal fitting is inserted into the terminal accommodation chamber from behind the housing, and the temporary locking portion has a cantilever shape extending forward and is arranged forward of the complete locking portion.

3. The connector of claim 1, wherein:

the retainer is formed with a base portion extending in parallel to a movement path between the temporary locking position and the complete locking position, and the temporary locking portion and the complete locking portion are shaped to project from the base portion.

4. The connector of claim 1, wherein:

the terminal accommodation chamber is formed inside a projection-like terminal accommodating portion, and the retainer is formed with a locking accommodation chamber for accommodating the terminal accommodating portion.

5. The connector of claim 4, wherein the temporary locking portion and the complete locking portion are accommodated in the locking accommodation chamber.

6. The connector of claim 1, wherein the arcuate guide surfaces comprise:

a first housing surface formed on an outer peripheral surface of the housing, a second housing surface communicating with the first housing surface and extending in a circumferential direction of the housing, a first retainer surface formed on an inner peripheral surface of the retainer, and a second retainer surface communicating with the first retainer surface and extending in a circumferential direction of the retainer.

7. The connector of claim 6, wherein the first retainer surface is configured to receive the first and second housing surfaces while the retainer rotates in sliding contact with the housing, and wherein the second retainer surface is configured to receive the housing.

8. The connector of claim 6, wherein the first housing surface is one of a plurality of first housing surfaces arranged at angular intervals on the outer peripheral surface of the housing, and wherein the first retainer surface is configured to receive an outer peripheral surface of the housing between adjacent first housing surfaces of the plurality of first housing surfaces while the retainer rotates in sliding contact with the housing.

9. The connector of claim 6, wherein the second housing surface is one of a plurality of second housing surfaces arranged at angular intervals on the outer peripheral surface of the housing, and wherein the second retainer surface is configured to receive an outer peripheral surface of the housing between adjacent second housing surfaces of the plurality of second housing surfaces while the retainer rotates in sliding contact with the housing.

10. The connector of claim 6, wherein the arcuate guide surfaces further comprise:

a third retainer surface formed on an inner surface of the retainer and disposed forward of the first and second retainer surfaces, and a third housing surface formed on an outer surface of the housing and disposed forward of the first and second housing surfaces, and wherein the first, second, and third housing surfaces are configured to individually slide in contact with the first, second, and third retainer surfaces, respectively.

11. The connector of claim 6, wherein the housing includes a disk portion, a plurality of guide protrusions formed on an outer peripheral edge of the disk portion, and a plurality of retaining ribs formed on the outer peripheral edge of the disk portion, wherein the first housing surface is formed on one of the plurality of guide protrusions, wherein the second housing surface is formed on one of the plurality of retaining ribs, and wherein the retainer includes a plurality of guide recesses arranged at angular intervals in the circumferential direction of the retainer, each guide recess of the plurality of guide recesses having an arc shape concentric with the retainer and being open in a rearward direction to receive the plurality of guide protrusions and the plurality of retaining ribs when the retainer is attached to the housing.

* * * * *